(12) United States Patent
Kondo

(10) Patent No.: US 6,170,462 B1
(45) Date of Patent: Jan. 9, 2001

(54) ELECTRONIC CONTROL UNIT FOR INTERNAL COMBUSTION ENGINE

(75) Inventor: Katsuhiko Kondo, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/322,973

(22) Filed: Jun. 1, 1999

(30) Foreign Application Priority Data

Jan. 22, 1999 (JP) .................................................. 11-014107

(51) Int. Cl.⁷ .............................. F02P 7/067; G01M 15/00
(52) U.S. Cl. .................................. 123/406.18; 73/117.3; 123/406.53; 123/406.55; 123/479
(58) Field of Search ........................ 123/406.18, 406.53, 123/406.55, 406.58, 479, 494; 73/116, 117.3

(56) References Cited

U.S. PATENT DOCUMENTS

| | | | | |
|---|---|---|---|---|
| 4,664,082 | * | 5/1987 | Suzuki | 123/406.18 |
| 4,951,628 | * | 8/1990 | Matsuoka et al. | 123/406.65 |
| 4,951,639 | * | 8/1990 | Iwata et al. | 123/613 |
| 4,979,487 | * | 12/1990 | Fukui | 123/643 |
| 5,554,802 | * | 9/1996 | Fukui et al. | 73/117.3 |
| 6,058,909 | * | 5/2000 | Nakashima | 123/406.59 |

FOREIGN PATENT DOCUMENTS 6-84739    10/1994  (JP).
7-81547  * 8/1995   (JP).

* cited by examiner

*Primary Examiner*—Tony M. Argenbright
(74) *Attorney, Agent, or Firm*—Sughrue, Mion, Zinn, Macpeak & Seas, PLLC

(57) ABSTRACT

An electronic control unit for an internal combustion engine is able to accurately identify cylinders even in such a case as starting an engine while the engine is still cold or with a deteriorated battery or even if the engine is started hurriedly, or hastened start is repeated. In the electronic control unit that measures the cycle of a signal issued from a crank angle sensor and identifies a cylinder according to a calculated value based on the cycle to control the internal combustion engine, the ratio of a present signal cycle and a previous signal cycle is compared with a judgment value, and cylinder identification is effected based on a time series pattern of the ratio, and the judgment value is changed on the basis of at least one of the temperature of the engine and battery voltage.

18 Claims, 9 Drawing Sheets

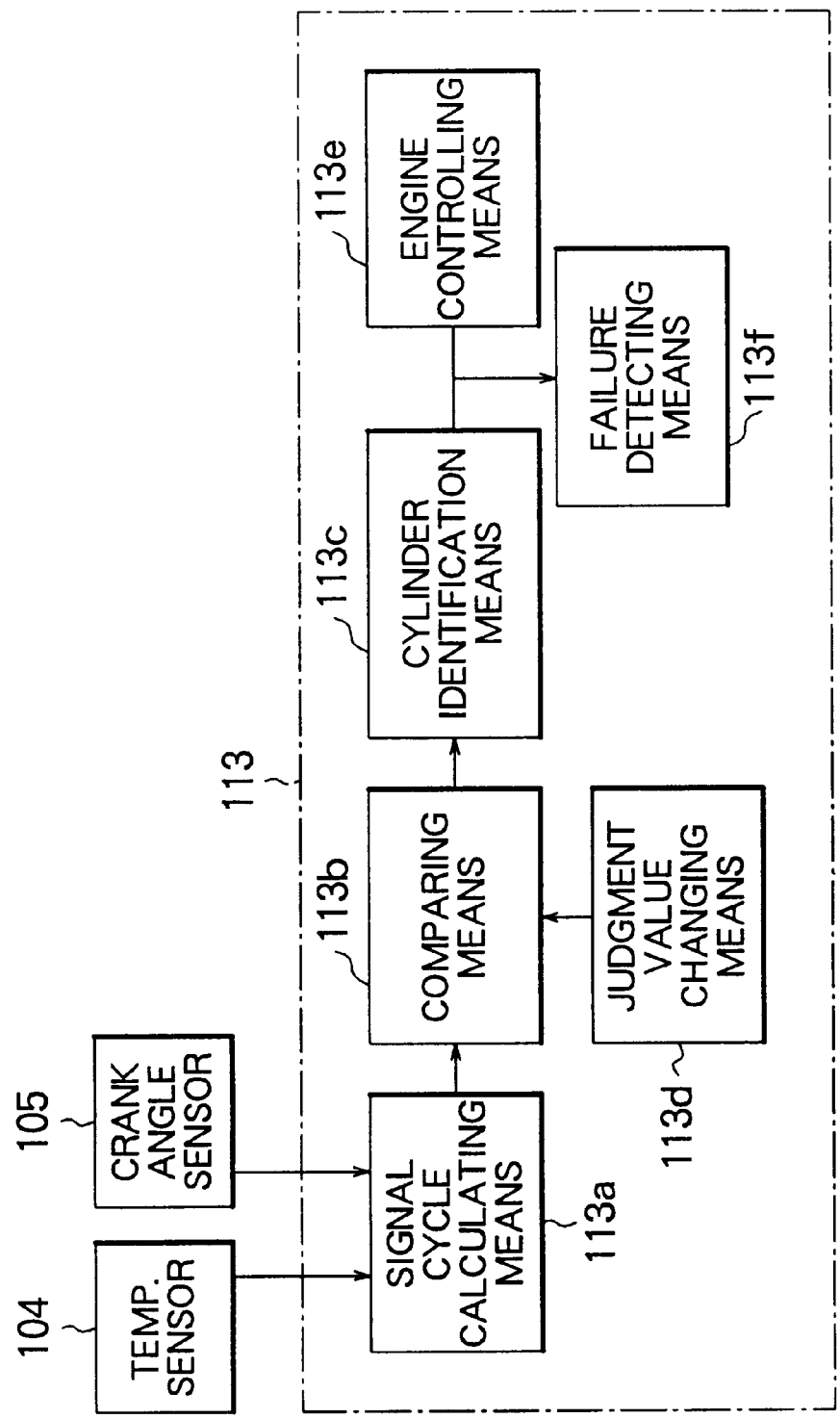

FIG. 2(a) CRANK ANGLE SENSOR SIGNAL & CYCLE RATIO

FIG. 2(b) CYLINDER IDENTIFICATION COUNTER VALUE SGP $$K(n) = T(n-1)/T(n)/2 \times 256$$

☆ : POSITION FOR DETERMINING A PARTICULAR CYLINDER
△ : POSITION FOR DETERMINING A CYLINDER GROUP

ELECTRONIC CONTROL UNIT FOR INTERNAL COMBUSTION ENGINE

BACKGROUND OF THE INVENTION

1. Field of the Invention

The present invention relates to an electronic control unit for an internal combustion engine that identifies cylinders and detects crank angles from signals issued by a crank angle sensor.

2. Description of the Related Art

A signal in synchronization with the revolution of an engine is used to control the ignition timing, fuel injection, etc., of an internal combustion engine. A generator producing the signal usually detects the revolution of a camshaft or a crankshaft of the engine. An example of a crank angle sensor is shown in FIG. 5 and FIG. 6. The crank angle sensor shown in these figures includes a rotary shaft 1 being rotatable in synchronization with an engine (not shown), a rotary disc 2 mounted on the rotary shaft and provided with a window 3 at a location corresponding to a desired detection angle, a light emitting diode 4, a photodiode 5 for receiving the light emitted from the light emitting diode 4, an amplifier circuit 6 connected to the photodiode 5 for amplifying an output signal of the photodiode 5, and an output transistor 7 connected to the amplifier circuit 6 and having an open collector. A window 3' for identifying a particular cylinder is provided in the rotary disc 2 so that it is asymmetrical to the window 3 so as to identify another cylinder.

Thus, the crank angle sensor outputs a signal illustrated in FIG. 7. The signal indicates that the falling edge of the signal for a particular cylinder, namely, cylinder #1, is offset 10 degrees toward delay side (ATDC 5 degrees or 5 degrees after the top dead center) from other cylinders, namely, cylinder #2, cylinder #3, and cylinder #4. The rising edge of the signal for all the cylinders is BTDC 75 degrees or 75 degrees before top dead center.

Referring now to FIG. 8 and FIG. 9, the operation for identifying a particular cylinder will be described. As shown in FIG. 8, the output signal of a crank angle sensor 8 is supplied to a microcomputer 10 via an interface circuit 9. The microcomputer 10 identifies the cylinder according to a flowchart shown in FIG. 9. First, in step S1, a high-level output period t and its rising section cycle T of a signal waveform shown in FIG. 7 are calculated. Then, the sequence proceeds to step S2 wherein a ratio t/T is calculated. Subsequently, in step S3, a mean threshold value $\alpha n$ that gives $t1/T > \alpha > t0/T$ is provided, and $\alpha n$ is determined according to the following operational expression:

$$\alpha n = (1-k)\alpha n{-}1 + k(t/T)n \text{ where } k = a \text{ constant}$$

The value of $\alpha n$ calculated in step S3 is compared with the ratio t/T (step S4), and if $t/T - \alpha n > 0$, then it is discriminated that the cylinder is the particular cylinder and an identification flag is set (step S5). If it is found in step S4 that $t/T - \alpha n < 0$, then it is determined that the cylinder is a different (i.e., non-particular) cylinder.

In the conventional cylinder identification apparatus for an internal combustion engine, if the duty of a signal in relation to the output signal cycle corresponding to a cylinder that is obtained from the crank angle sensor should indicate an abnormal value due to a fluctuating revolution of the engine or the like, then this is undesirably reflected on the threshold value $\alpha n$, posing a problem in that, even after the duty of the signal restores a normal value, the influence by the foregoing abnormal value stays on, resulting in erroneous determination.

A solution to the aforesaid problem has been proposed in Japanese Examined Patent Publication No. 6-84739. The second conventional prior art example is designed so that, if an abnormal signal duty occurs, then it is inhibited from affecting the calculation of a threshold value to thereby permit quick and accurate identification of a cylinder.

FIG. 10 is a simplified block diagram of a cylinder identification apparatus for an internal combustion engine in accordance with the conventional art, and FIG. 11 is a flowchart illustrating a cylinder identification routine effected by the cylinder identification apparatus.

The cylinder identification apparatus shown in FIG. 10 includes the same components 8 and 9 as those of the first prior art example, a microcomputer 10A, an operational calculator or calculating means 11, a comparator or comparing means 12, and a cylinder identifier or cylinder identifying means 13.

Referring to the flowchart of FIG. 11, the cylinder identification operation performed by the cylinder identification apparatus for an internal combustion engine configured as discussed above will be described. The microcomputer 10A shown in FIG. 10 calculates, by the calculating means 11, the values of a high-level output period t and its rising section cycle T of a signal sent from the crank angle sensor 8 via the interface circuit 9 according to FIG. 2 (step S1).

Then in step S2, by using the calculating means 11, a ratio t/T is calculated on each cylinder by adopting t and T, which have been determined in step S1. In step S6, it is determined by the comparing means 12 whether or not the ratio t/T lies within a specified range; if the t/T has been found to lie outside the specified range, then the present ratio t/T is set to a specified value in step S7. In other words, step S7 involves a calculation inhibiting means for inhibiting the value of the present ratio t/T from being reflected in the calculation of the threshold value $\alpha n$ if the value of the present ratio t/T turns out to be abnormal. The microcomputer 10A then advances to step S3 wherein it causes the calculating means 12 to calculate a mean threshold value $[\alpha n = (1-k)\alpha n{-}1 + k(t/T)n]$ that is the mean value of the ratios of all cylinders based on the specified value.

On the other hand, if the value of t/T obtained in step S6 is found to lie within the specified range, then the foregoing mean threshold value $\alpha n$ is calculated based on the value of the present ratio t/T by the calculating means 12. In step S4 and step S5, the same operation as that in the conventional art is carried out, and the value of the ratio for each cylinder, which has been obtained as mentioned above, is compared with the mean threshold value $\alpha n$ (step S4), and if the comparison result indicates that the former is larger than the latter, then the cylinder is identified as a particular cylinder. In this case, cylinder #1 is identified and a flag is set at a register corresponding to cylinder #1 (step S5). If the comparison result indicates that the former is smaller than the latter, then the process returns. Thus, when a particular cylinder or cylinder #1 in this case has been identified, revolution signals will be obtained in the order of cylinder #1, cylinder #3, cylinder #4, and cylinder #2, so that the remaining cylinders can be identified in the order of cylinder #3, cylinder #4, and cylinder #2.

The cylinder identification technique discussed above enables accurate determination even if the signal duty should have an abnormal value due to fluctuations in revolution of an engine since the abnormal value is not reflected on the calculation of the mean threshold value.

The second conventional art, however, has the following shortcoming.

If an engine is started while it is cold or with a deteriorated battery or the like, marked cyclic variation is observed in the revolution of the engine. This may sometimes lead to cylinder identification errors, resulting in improper ignition, erroneous fuel injection, or other improper engine control.

Also if a hastened engine start is made or if hastened engine start is repeated, marked cyclic fluctuations in revolution may take place or the revolution of an engine may be reversed. This is also likely to lead to cylinder identification errors with a resultant possibility of erroneous engine control.

A plurality of crank angle signals are detected to identify cylinders before starting ignition control or fuel injection control, thus taking a prolonged time to complete a startup process.

For the crank angle sensor 5, there has been known a magnetic type sensor as disclosed in Japanese Examined Patent Publication No. 7-81547. In this type of crank angle sensor, teeth composed of projections and recessions are formed on the outer periphery of a round rotary magnetic member, which is provided on a camshaft or the like that rotates in synchronization with the crankshaft, and the rotational positions of the teeth are magnetically detected by using a magnetic sensor. Using the magnetic crank angle sensor poses a shortcoming in that even if inaccurate detection is carried out due to a failure of the crank angle sensor such as a missing tooth of its rotary magnetic member, the failure of the crank angle sensor cannot be detected. This also causes a cylinder identification error, resulting in a possibility of engine control errors, including erroneous ignition and erroneous fuel injection.

SUMMARY OF THE INVENTION

Accordingly, the present invention is intended to solve the problems described above, and it is an object thereof to provide an electronic control unit for an internal combustion engine that is capable of accurate cylinder identification even in such a case as starting an engine while the engine is still cold or with a deteriorated battery.

It is another object of the present invention to provide an electronic control unit for an internal combustion engine that is capable of accurate cylinder identification even if the engine is started hurriedly or hastened start is repeated.

It is still another object of the present invention to provide an electronic control unit for an internal combustion engine that is capable of making the time required for completing a startup process shorter than that in the conventional prior examples discussed above.

It is a further object of the present invention to provide an electronic control unit for an internal combustion engine that is able to quickly detect a failure of a crank angle sensor that leads to a cylinder identification error, the failure including a missing tooth of a rotary magnetic member of the crank angle sensor.

According to one aspect of the present invention, there is provided an electronic control unit for controlling an internal combustion engine by measuring a cycle of a signal output from a crank angle sensor and identifying a cylinder according to a calculated value determined on the basis of the cycle, the electronic control unit comprising: detecting means for detecting at least one of a temperature of the engine or a battery voltage; signal cycle calculating means for calculating a ratio of a present signal cycle to a previous signal cycle; comparing means for comparing the ratio calculated by the signal cycle calculating means with a judgment value; cylinder identifying means for identifying a cylinder according to a comparison result given by the comparing means; and judgment value changing means for changing the judgment value according to at least one of the temperature of the engine and the battery voltage that has been detected by the detecting means.

In a preferred form of the invention, engine controlling means is provided which effects cylinder identification for a predetermined number of times or more before it starts engine control.

In a further preferred form of the invention, the engine controlling means changes the predetermined number of times according to at least one of the temperature of the engine and the battery voltage.

In another aspect of the present invention, there is provided an electronic control unit for controlling an internal combustion engine by measuring a cycle of a signal output from a crank angle sensor and identifying a cylinder according to a calculated value determined on the basis of the cycle, the electronic control unit comprising: signal cycle calculating means for calculating a ratio of a present signal cycle to a previous signal cycle; comparing means for comparing the ratio calculated by the signal cycle calculating means with a judgment value; cylinder identifying means for identifying a cylinder according to a comparison result given by the comparing means; and engine controlling means for effecting engine control according to a cylinder identification result.

In a yet further preferred form of the invention, if a crank angle signal is produced by the crank angle sensor at a predetermined cycle or less in a low rotational speed zone of the engine, cylinder identification information is cleared, and the engine control by the engine controlling means is aborted.

In a still further preferred form of the invention, the engine control is at least one of ignition timing control and fuel injection control.

In a further preferred form of the invention, the engine controlling means changes the predetermined cycle according to at least one of the temperature of the engine and the battery voltage.

In a further preferred form of the invention, the engine controlling means sets the predetermined cycle longer as the temperature is lower or the battery voltage is lower.

In a further preferred form of the invention, if a start switch for stating the engine is changed from ON to OFF at a predetermined rotational speed or less, then cylinder identification information is cleared, and the engine control by the engine controlling means is aborted.

In a further preferred form of the invention, the abortion of the engine control is that at least one of ignition timing control and fuel injection control is aborted.

In a further preferred form of the invention, the engine controlling means inhibits cylinder identification until the start switch is turned on next.

In a further preferred form of the invention, if a start switch for starting the engine is changed from OFF to ON before an engine rotational speed reaches a predetermined rotational speed or more since the start switch has been turned on, then the predetermined number of times is changed.

In a further preferred form of the invention, changing the predetermined number of times is to increase the predetermined number of times.

In a further preferred form of the invention, the engine control is at least one of ignition timing control and fuel injection control, and the predetermined number of times of fuel injection control is decreased.

According to a further aspect of the present invention, there is provided an electronic control unit for controlling an internal combustion engine by measuring a cycle of a signal output from a crank angle sensor and identifying a cylinder according to a calculated value determined on the basis of the cycle, the electronic control unit comprising: signal cycle calculating means for calculating a ratio of a present signal cycle to a previous signal cycle; comparing means for comparing a ratio calculated by the signal cycle calculating means with a judgment value; cylinder identifying means for identifying a cylinder according to a comparison result given by the comparing means; and failure determining means for determining that a crank angle sensor is faulty if the number of times of cylinder identification among a predetermined number of received crank angle signals is a predetermined value or less.

In a preferred form of the invention, the judgment value comprises a plurality of judgment values, and the comparing means compares the ratio of a present signal cycle to a previous signal cycle with a plurality of the judgment values to classify it into one of a plurality of zones according to the magnitude thereof, and the cylinder identifying means effects cylinder identification according to a time series pattern of the ratio classified into one of a plurality of the zones by the comparing means.

In a further preferred form of the invention, the cylinder identification is to identify at least one of a particular cylinder and a particular cylinder group.

The above and other objects, features and advantages of the present invention will become more readily apparent from the following detailed description of a preferred embodiment of the invention taken in conjunction with the accompanying drawings.

BRIEF DESCRIPTION OF THE DRAWINGS

FIG. 1B is a functional block diagram of the electronic control unit;

FIG. 2A is a diagram showing output signals and signal Nos. of a crank angle sensor;

FIG. 2B shows the cycles of the output signals of the crank angle sensor (STG cycle: crank angle), cycle ratio K(n), and the class of the cycle ratio;

DESCRIPTION OF THE PREFERRED EMBODIMENT

A presently preferred embodiment of the present invention will be described while referring to the accompany drawings.

Figure 1A:
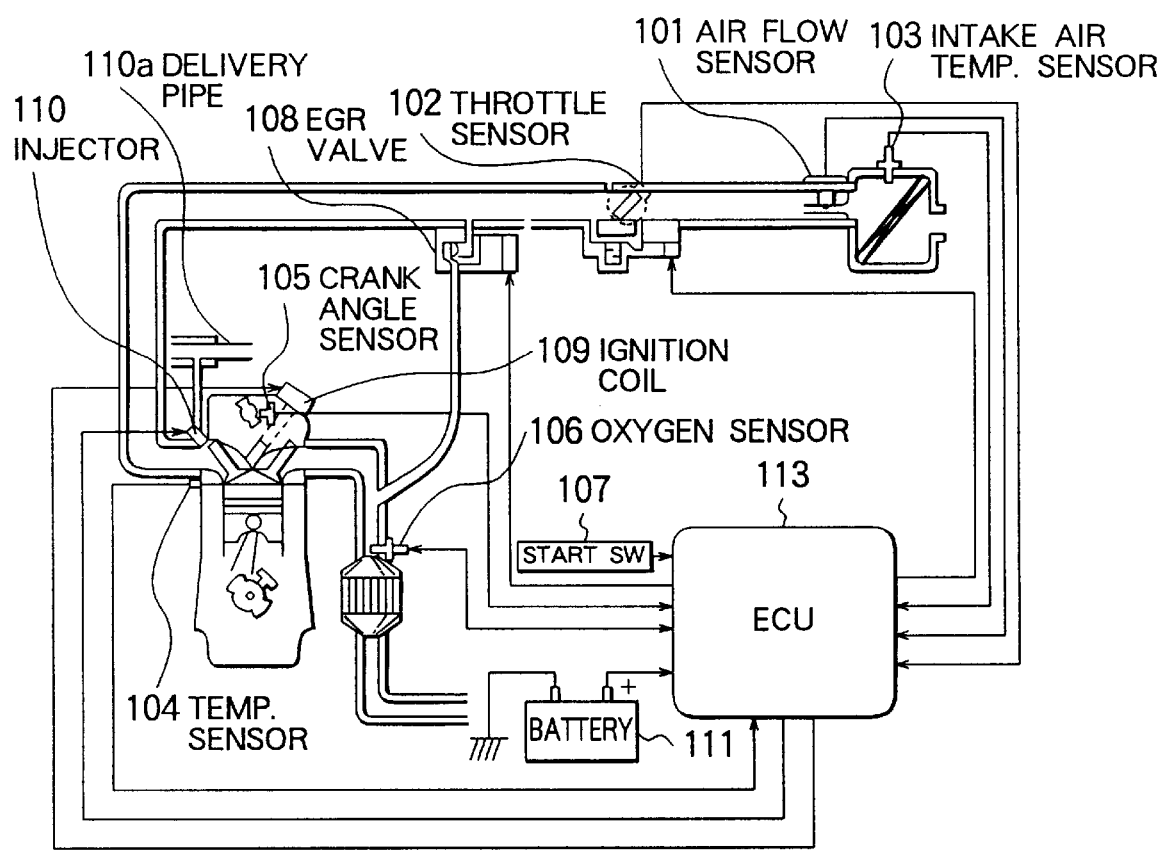
FIG. 1A shows a schematic configuration of an internal combustion engine in which an electronic control unit in accordance with the present invention has been installed.

FIG. 1A is a simplified block diagram of an internal combustion engine in which an electronic control unit in accordance with the present invention has been installed. The internal combustion engine shown in FIG. 1A includes an air flow sensor 101 provided in an intake pipe of the internal combustion engine to measure the quantity of air introduced into the engine, a throttle sensor 102 for detecting the opening of a throttle valve provided in the intake pipe, an intake air temperature sensor 103 installed to an air cleaner at the distal end of the intake pipe to detect the temperature of intake air, a temperature sensor 104 mounted on the main body of the engine to detect the temperature of cooling water, a crank angle sensor 105 for detecting the rotational angle of a crankshaft by detecting the revolution of a camshaft or the like that rotates in synchronization with the crankshaft of the engine, an oxygen sensor 106 for measuring the flow of oxygen in an exhaust pipe to thereby detect a combustion state of an fuel-air mixture in the engine, and a start switch 107 provided in a driver's cabin of a vehicle (not shown). The internal combustion engine further includes an exhaust gas recirculation (EGR) valve 108 that recirculates a part of exhaust gas into the intake pipe according to the operating condition of the engine, an ignition coil 109 for causing a spark plug (not shown) to generate a spark ignition to fire the fuel-air mixture in a combustion chamber in the main body of the engine, an injector 110 connected to a fuel tank (not shown) via a delivery pipe 110a and installed to the intake pipe with its distal end being opened into the intake pipe so as to inject fuel into the intake pipe, a battery 111 for supplying electric power to a variety of devices of the vehicle, and an electronic control unit 113 that receives output signals from various sensors, the start switch 7, etc., to control the exhaust gas recirculation valve 108, the ignition coil 109, the injector 110, etc., to thereby control the engine. The electronic control unit 113 controls the engine by executing a control program built therein. The electronic control unit 113 detects a battery voltage based on the voltage supplied thereto by the battery 111.

FIG. 1B is a functional block diagram of the electronic control unit 113. As shown in FIG. 1B, the electronic control unit 113 is equipped with a signal cycle or period calculating means 113a in the form of a signal cycle calculator for calculating the ratio of the present signal cycle to the previous signal cycle, a comparing means 113b in the form of a comparator for comparing the ratio, which has been calculated by the signal cycle calculating means 113a, with a judgment or threshold value, a cylinder identifying means 113c in the form of a cylinder identifier for identifying a cylinder according to a comparison result given by the comparing means 113b, and a judgment value changing means 113d in the form of a judgment value changer that changes the judgment value according to at least one of the temperature of an engine and a battery voltage.

The electronic control unit 113 is further provided with an engine controlling means 113e that repeatedly performs cylinder identification not less than a predetermined number of times before starting engine control. The predetermined number of times is changed according to at least one of the temperature of an engine and the battery voltage. The engine controlling means 113e clears cylinder identification information indicative of the number of times of cylinder identification and aborts engine control if a crank angle signal is generated at a value lower than a predetermined cycle in a low-revolution zone of the engine. The predetermined cycle is changed according to at least one of the temperature of the engine and the battery voltage, and it is set longer as the temperature is lower or the battery voltage is lower. Further, if the start switch is changed over from ON to OFF at not more than a predetermined rotational speed, then the engine controlling means 113e clears the cylinder identification information indicative of the number of times of cylinder identification, and aborts engine control (at least either ignition timing control or fuel injection control). The electronic controlling means 113e inhibits cylinder identification until the start switch is set to ON next.

If the start switch is changed over from OFF to ON before the engine rotational speed reaches the predetermined rotational speed or more since the start switch was set to ON, then the cylinder identifying means 113c changes the predetermined number of times; more specifically, it increases the value of the predetermined number of times. The engine controlling means 113e starts the engine control when the cylinder identification has been repeated a predetermined number of times or more.

The electronic control unit 113 is further equipped with a failure determining means 113f which determines that the crank angle sensor has failed if the number of times of cylinder identification among the crank angle signals received by a predetermined number of times is a predetermined value or less.

The comparing means 113b compares the ratios of the present signal cycle to the previous signal cycle with a plurality of judgment values to classify them into a plurality of zones according to the magnitude thereof. The cylinder identifying means 113c effects cylinder identification according to a time series pattern of the ratios classified into a plurality of the zones by the comparing means 113b.

FIG. 2A and FIG. 2B respectively show the output signals of the crank angle sensor 115 of a four-cylinder internal combustion engine and the cycle ratios of adjacent output signals. The example shown indicates a case wherein the present invention has been applied to a four-cylinder internal combustion engine. In this case, it is assumed that the first and fourth cylinders are ignited at the same time, and the second and third cylinders are ignited at the same time.

Figure 2C:
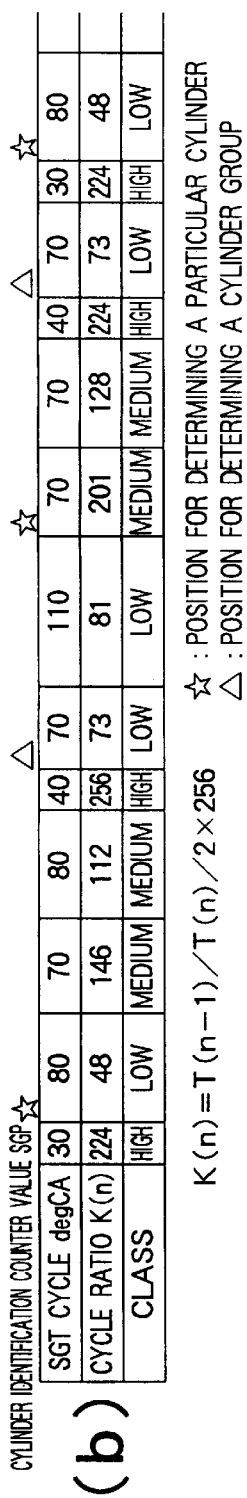
FIG. 2C is a schematic diagram showing an example of the crank angle sensor.
Figure 2C:
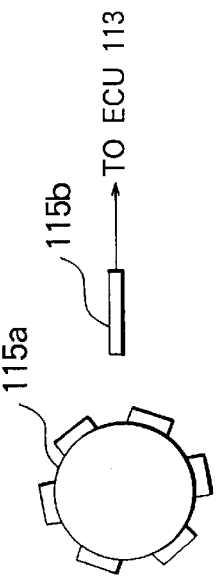

FIG. 2C is a schematic diagram illustrating an example of the crank angle sensor 115. The crank angle sensor 115 in the figure is composed of a rotary magnetic member 115a which is mounted on a camshaft or the like that rotates in synchronization with a crankshaft of an engine, and a magnetic detector 115b disposed near the rotary magnetic member 115a for detecting the rotational position thereof. The rotary magnetic member 115a is provided on the outer periphery thereof with teeth comprising a plurality of projections and recessions indicative of respective rotational positions thereof for detecting a crank angle. The magnetic detector 115b is disposed in an opposed relation with respect to the projections of the rotary magnetic member 115a so that it can detect changes in the magnetic force which will be caused by changes in the distance of the detector relative to the projections and recessions, thereby detecting the rotational positions of the projections and recessions (i.e., crank angles). The output signals of the magnetic detector 115b are supplied to the electronic control unit 113. The crank angle sensor 115 is not limited to such a magnetic type as adapted to detect crank angles by utilizing magnetism, but instead it may be of the optical type which is shown in the aforementioned conventional art example or of any other types as long as they are able to detect the rotational positions, i.e., the crank angles of a crankshaft.

In FIG. 2A, the output signals of the crank angle sensor 115, which are denoted by SGT, are generated at predetermined positions or points, namely, B5 (signal No. 10) that indicates a crank angle of 5 degrees before the top dead center of a piston reciprocating in the main body of an engine, 30 degrees therefrom (signal No. 0), 80 degrees therefrom (signal No. 1), 70 degrees therefrom (signal No. 2), 80 degrees therefrom (signal No. 3), 40 degrees therefrom (signal No. 4), 70 degrees therefrom (signal No. 5), 110 degrees therefrom (signal No. 6), 70 degrees therefrom (signal No. 7), 70 degrees therefrom (signal No. 8), 40 degrees therefrom (signal No. 9), and 70 degrees therefrom (signal No. 10). This means that eleven output signals are generated while the crankshaft rotates once or while the camshaft rotates twice.

The cycle ratios K(n) of the output signals or the crank angle signals of the crank angle sensor 115 are represented by the following formula:

$$K(n) = T(n-1)/T(n)/2 \times 256 \qquad (1)$$

where T(n) indicates the present crank angle signal cycle, and T(n−1) indicates a previous crank angle signal cycle. The cycle ratios K(n) are grouped, for example, into three classes, namely, high, medium, and low classes. For instance, if the value of K(n) is the first judgment value (e.g. 210) or more, then it belongs to the high class; if it is below the first judgment value and not less than the second judgment value (e.g. 100), then it belongs to the medium class; and if it is below the second judgment value, then it belongs to the low class. In FIG. 2B, the blank star marks denote the positions where particular cylinders are determined, and the blank triangle marks denote the positions where cylinder groups are determined.

The electronic control unit 113 measures the crank angle signal cycles T based on the outputs of the crank angle sensor 115, calculates the cycle ratios K(n) according to the above formula (1), and classifies the crank angle signal cycles T into a plurality of zones (e.g. high, medium, and low) according to the obtained cycle ratios K(n). By verifying the classes in terms of time series, the cylinder identification is effected according to the time series pattern, and an initial value is set at a cylinder identification counter built into the electronic control unit 113. After the initial value has been set, the cylinder identification counter starts counting. A value SGP on the cylinder identification counter is compared with a cylinder identification result as necessary to decide whether the crank angle sensor 115 is faulty, and if it is found to be faulty, i.e., if the value SGP on the cylinder identification counter does not coincide with a cylinder identification result, then a correction is made. The electronic control unit 113 controls the injector 110 and the ignition coil 109 to thereby carry out fuel control and ignition control according to the value SGP on the cylinder identification counter and the cylinder determination state.

The cylinder identification is effected as described below.

When K(n−1)=Medium, and K(n)=High (determination of a cylinder group):

The cylinder group (the first cylinder #1 and the fourth cylinder #4) is determined, and it is decided that the present pulse is at B75 degrees (B75 degCA)(75 degrees before top dead center) of the first cylinder #1 and the fourth cylinder #4, i.e., signal No.=9 or 4.

When K(n−1)=Low, and K(n)=High (Determination of a particular cylinder):

The particular cylinder (the third cylinder #3) is determined, and it is decided that the next pulse will be at B75 degrees (B75 degCA) (75 degrees before top dead center) of the third cylinder #3, i.e., signal No.=0.

When K(n−1)=Low, and K(n)=Low (Determination of a particular cylinder):

The particular cylinder (the second cylinder #2) is determined, and it is decided that the present pulse is at B75 degrees (B75 degCA) (75 degrees before top dead center) of the second cylinder #2, i.e., signal No.=6.

Figure 3:
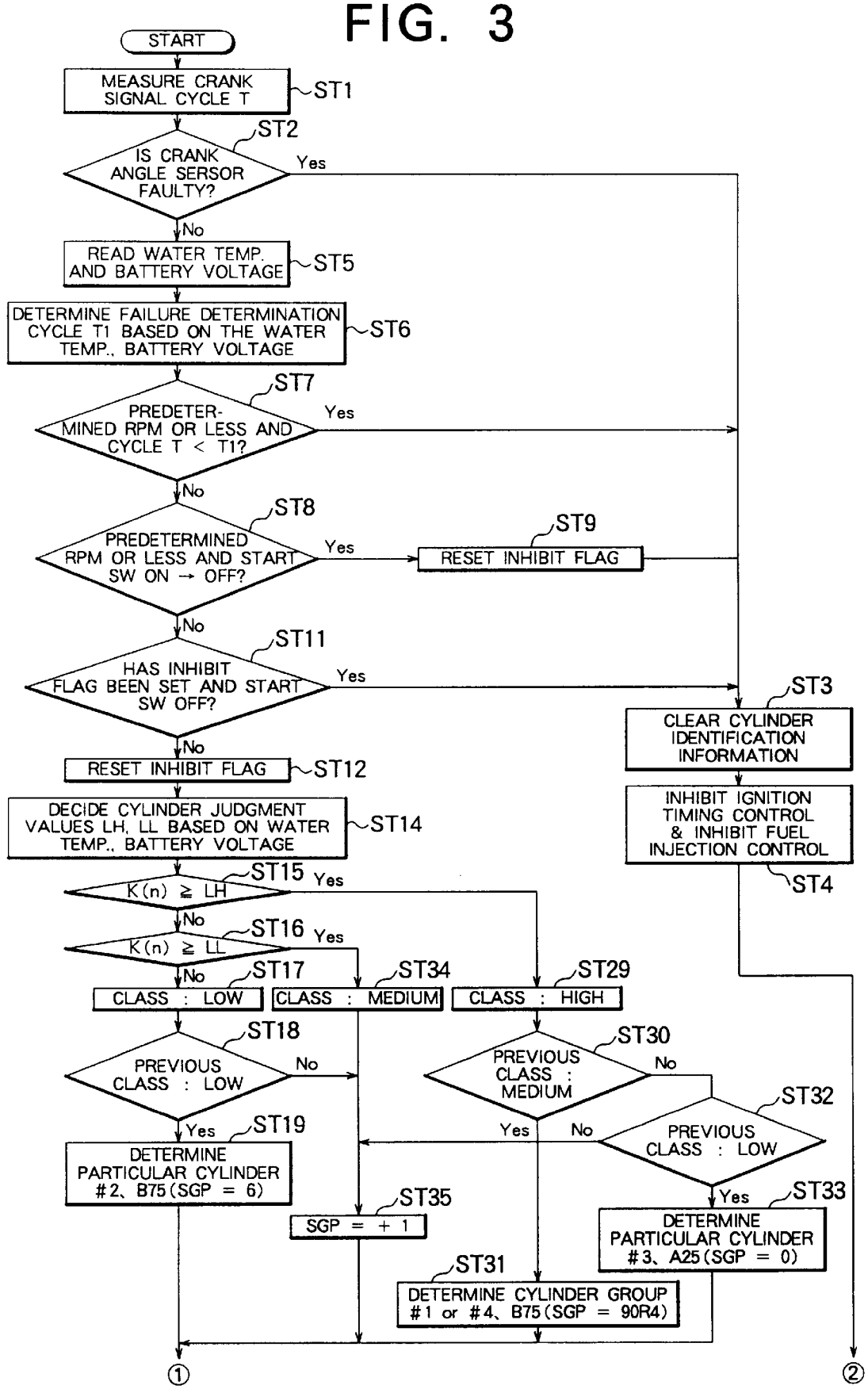
FIG. 3 is a flowchart illustrating the operation of the electronic control unit in accordance with the present invention.
Figure 4:
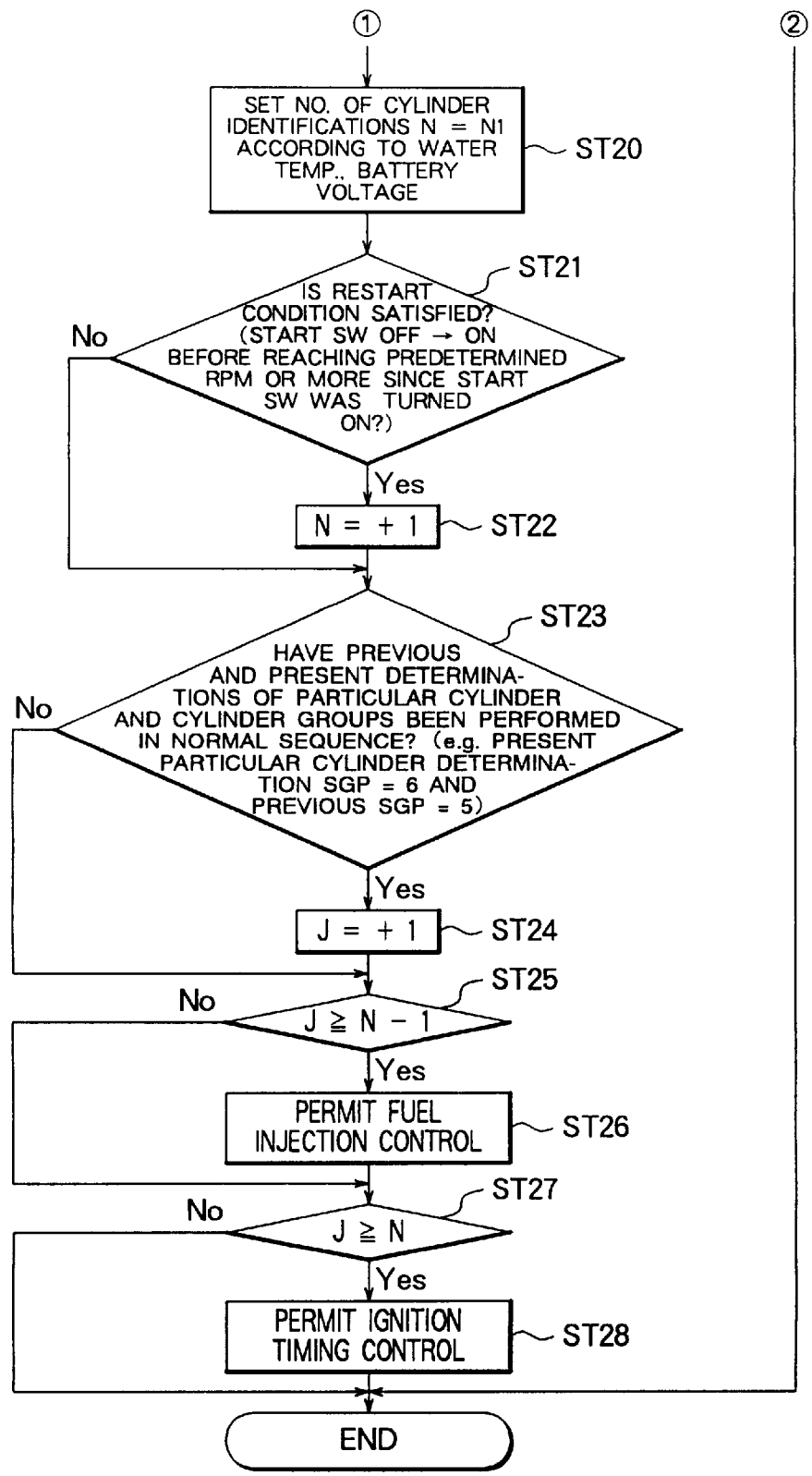
FIG. 4 is another flowchart illustrating the operation of the electronic control unit in accordance with the present invention.
Figure 5:
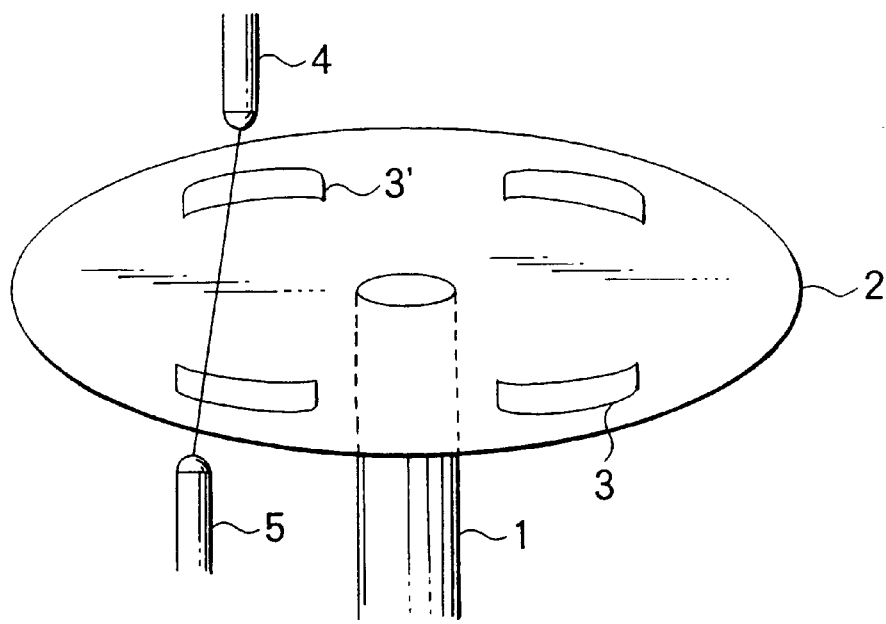
FIG. 5 is a diagram showing the structure of a first conventional crank angle sensor.
Figure 6:
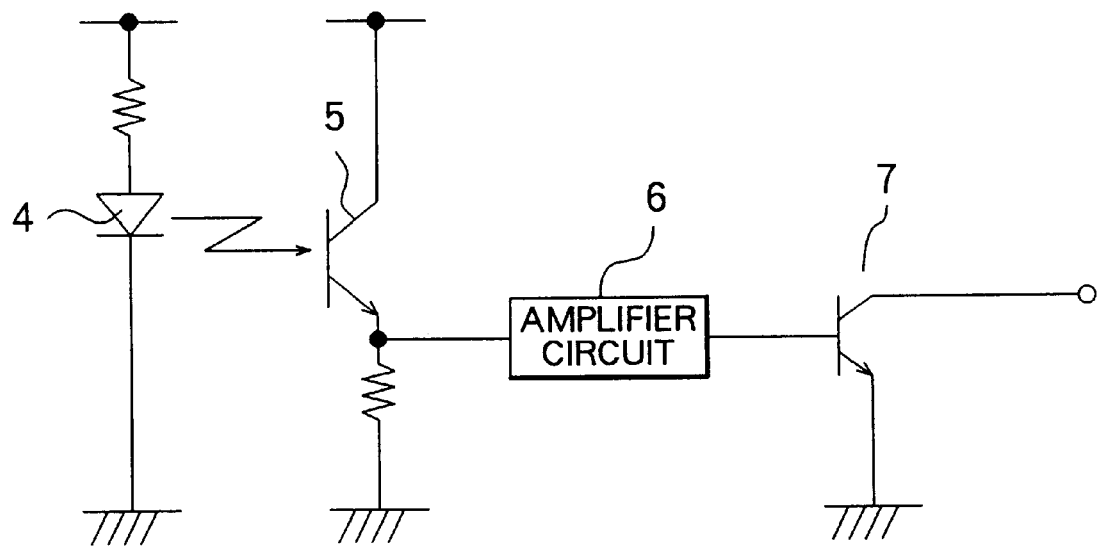
FIG. 6 is a signal processing circuit diagram of the first conventional crank angle sensor.
Figure 7:
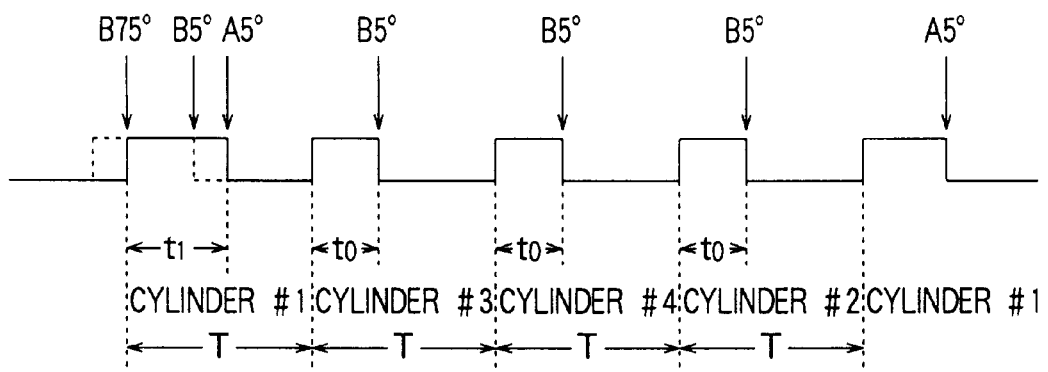
FIG. 7 is a signal waveform diagram of the first conventional crank angle sensor.
Figure 8:
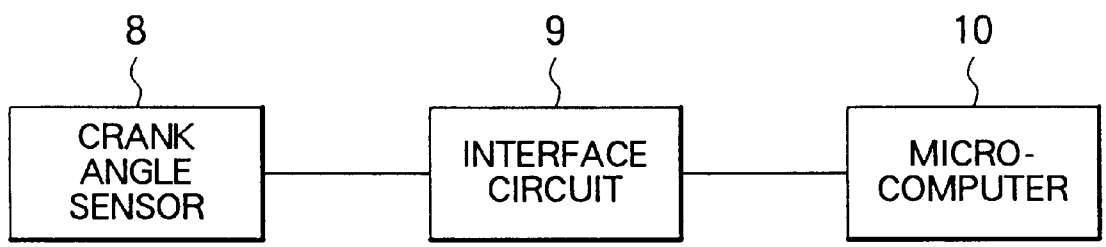
FIG. 8 is a simplified block diagram showing a first conventional cylinder identification apparatus for an internal combustion engine.
Figure 9:
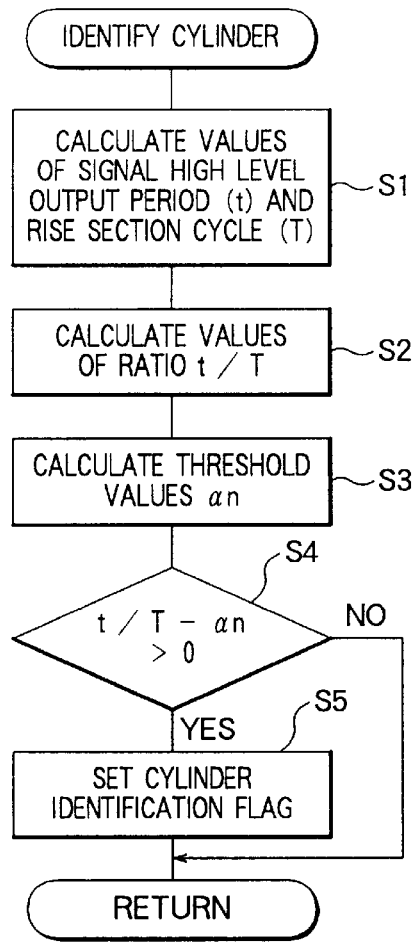
FIG. 9 is a flowchart illustrating a first conventional cylinder identification routine.
Figure 10:
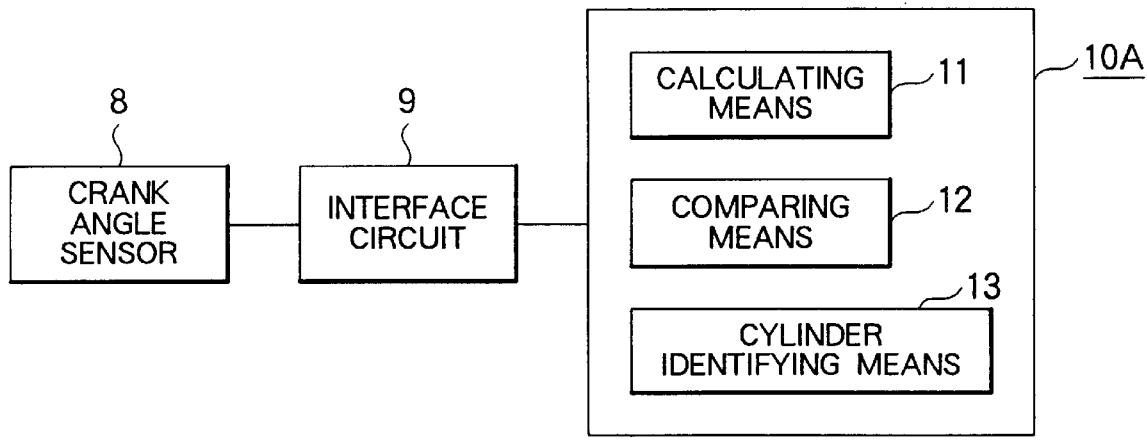
FIG. 10 is a simplified block diagram showing a second conventional cylinder identification apparatus for an internal combustion engine.
Figure 11:
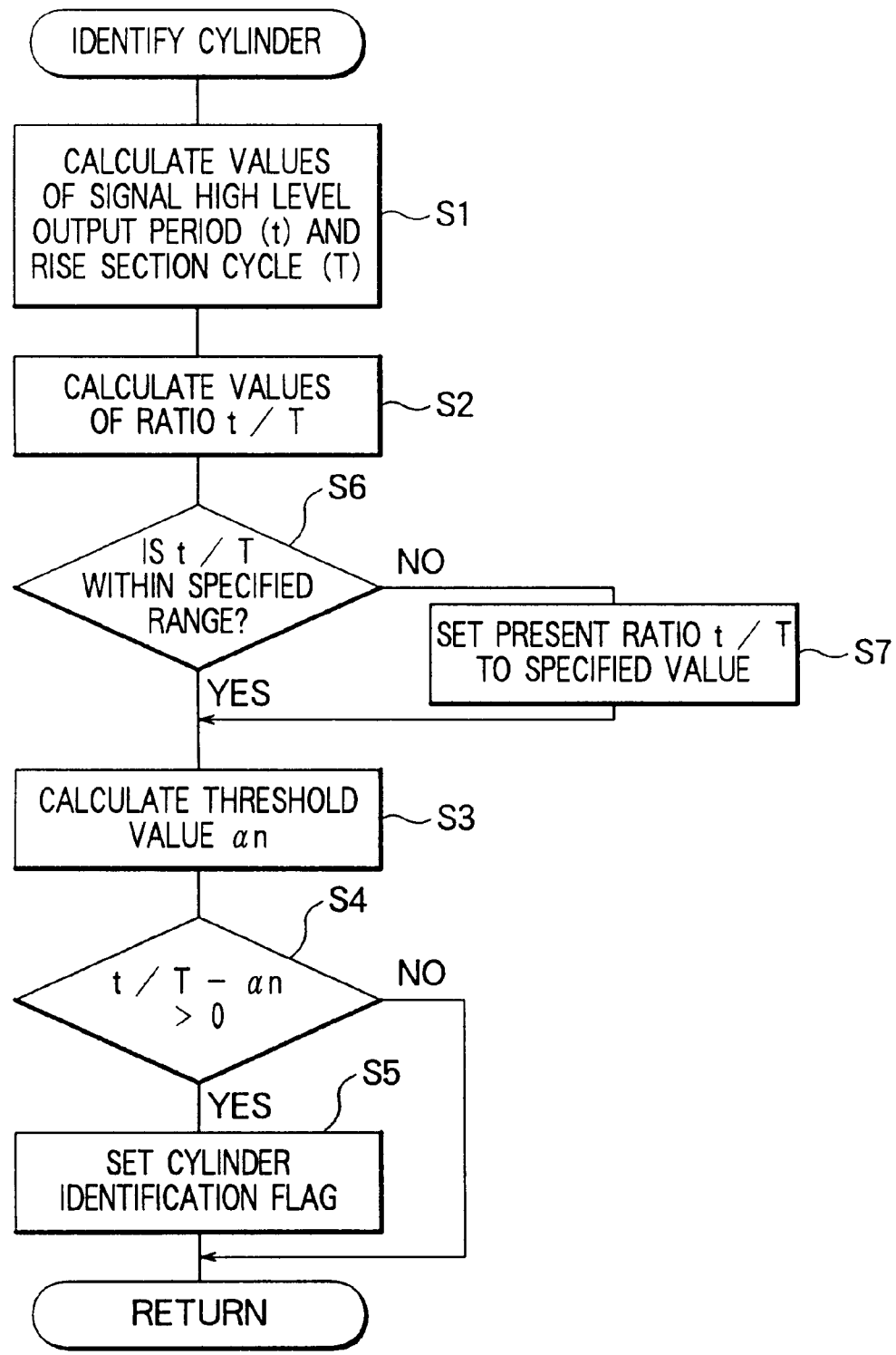
FIG. 11 is a flowchart illustrating a second conventional cylinder identification routine.

Referring now to the flowcharts shown in FIG. 3 and FIG. 4, the operation of the electronic control unit in accordance with the present invention will be described. The entire flow of the operation is completed by combining the flowcharts of FIG. 3 and FIG. 4. First, based on an output of the crank angle sensor 115, the crank angle signal cycle T is measured to calculate the cycle ratio K(n) (step ST1).

Then, it is determined as to whether the crank angle sensor 115 is faulty (step ST2). More specifically, when a predetermined number of crank angle signals have been received in the past, it is determined as to whether the number of times of identification of a particular cylinder or cylinder group is a predetermined value or less. If the determination result is affirmative, then the crank angle sensor 115 is determined to be faulty (e.g., a missing tooth); or if the determination result is negative, then the crank angle sensor 115 is determined to be normal.

If it is decided in step ST2 that the crank angle sensor 115 is faulty, then the cylinder identification information such as the number of times of identification of a particular cylinder or cylinder group is cleared in step ST3, and the ignition timing control and the fuel injection control are inhibited in step ST4 before the processing is terminated.

If it is decided that in step ST2 that the crank angle sensor 115 is normal, then the temperature of the cooling water of the engine is read from an output of the temperature sensor 3, and the battery voltage is also determined from the output of the battery 11 (step ST5), and a failure determination cycle T1 is determined based on at least the cooling water temperature and the battery voltage (step ST6). The failure determination cycle T1 is decided as follows: a table of optimum values based on at least one of the cooling water temperature and the battery voltage is prepared in advance by experiments or the like, and the failure determination cycle T1 is determined based on at least one of an actually detected cooling water temperature and an actually detected battery voltage by referring primarily to the table.

Subsequently, it is determined in step ST7 whether the engine speed is of a predetermined value or less and whether the cycle T is not more than the failure determination cycle T1; if the determination result is YES, then it is decided that the revolution of the engine is too unstable to effect the failure determination, and the sequence proceeds to step ST3.

If the determination result in step ST7 is NO, then it is determined in step ST8 whether the engine speed is a predetermined value or less and whether the start switch 7 has been changed from ON to OFF; if the determination result is YES, then the an inhibit flag is set in step ST9, then the sequence proceeds to step ST3.

If the determination result is NO in step ST8, the sequence proceeds to step ST11, and if the determination result in ST11 is YES, then the sequence advances to step ST3; or if the determination result is NO, then the sequence resets the inhibit flag in step ST12. It is then decided in step ST14 a first cylinder judgment value LH and a second cylinder judgment value LL according to at least one of the cooling water temperature and the battery voltage, and it is further decided in step ST15 whether the cycle ratio K(n) is the first cylinder judgement value LH or more. If K(n) is below LH, then it is further determined in step ST16 whether K(n) is the second cylinder judgment value LL or more, and if the determination result is NO, then it is decided in step ST17 that the class of the cycle ratio K(n) is Low.

Next, it is determined in step ST18 whether the class of the previous cycle ratio K(n) was Low, and if the determination result is YES, then it is decided in step ST19 that the cylinder is the second cylinder #2, the crank angle is B75, and the value SGP on the cylinder identification counter is 6, and the sequence advances to step ST20.

If the determination result in step ST15 is YES, then it is decided in step ST29 that the class of the cycle ratio K(n) is Top, and it is determined in step ST30 whether the previous class was Medium. If the determination result is YES, then it is decided in step ST31 that the present cylinder group is the first cylinder #1 or the fourth cylinder #4, the crank angle is B75, and the value SGP on the cylinder identification counter is 9 or 4, then the sequence advances to step ST20.

If the determination result in step ST30 is NO, then it is determined whether the previous class was Low. ff the determination result is YES, then it is decided in step ST33 that the present cylinder is the third cylinder #3, and the crank angle is A25, i.e., 25 degrees after top dead center, and the sequence advances to step ST20. If the determination result in step ST32 is NO, then the sequence advances to step ST35.

If the determination result in step ST16 is YES, then it is decided in step ST34 that the present class is Medium, and 1 is added to the value SGP on the cylinder identification counter in step ST35 before the sequence proceeds to step ST20. If the determination result in step ST18 is NO, then the sequence proceeds to step ST35.

In step ST20, the number of times of cylinder identification N is set as N=N1 based on at least one of the cooling water temperature and the battery voltage, and it is determined whether a restart condition is satisfied, i.e., if the start switch 7 has been changed from OFF to ON before reaching a predetermined rotational speed or more since the start switch 7 was turned on (step ST21). If the determination result is YES, then 1 is added to the value SGP on the cylinder identification counter, and the sequence advances to step ST23; if the determination result is NO, then the sequence proceeds to step ST23, skipping step ST22.

In step ST23, it is decided whether the previous and present determinations of particular cylinders and cylinder groups have been performed in a normal sequence (e.g. whether the present particular cylinder determination SGP= 6, and the previous SGP=5). If the determination result is YES, then 1 is added in step ST21 to a number J of determination coincidences, and the sequence advances to step ST24; or if the determination result is NO, then the sequence advances to step ST25, skipping step ST24.

In step ST25, it is determined whether the number J of determination coincidences is N−1 or more; if the determination result is YES, then the fuel injection control is enabled; or if the determination result is NO, then the sequence advances to step ST27, skipping step ST26.

In step ST27, it is determined whether the number J of determination coincidences is N or more; if the determination result is YES, then the ignition timing control is enabled and the processing is terminated, or if the determination result is NO, then step ST28 is skipped and the processing is terminated.

In the above description, the signal cycle shown in FIG. 2A is just an example; any values (e.g., crank angle intervals) may be used.

Further, in step ST4, both ignition timing control and fuel injection control have been inhibited; alternatively, however, only one of them may be inhibited.

Thus, according to the present invention, in an electronic control unit that measures the cycle of signals issued from a crank angle sensor and identifies a cylinder according to a value calculated based on the cycle to control an internal combustion engine, the ratio of a present signal cycle to the previous signal cycle is compared with a judgment value, a cylinder is identified based on the comparison result, and the judgment value is changed according to at least one of the temperature of the engine and battery voltage. This makes it possible to improve the accuracy of cylinder identification even if marked cyclic fluctuations or the reversed revolution of the engine occurs at the time of starting the engine while the engine temperature is low or when the battery is deteriorated.

Moreover, the engine control is started after the cylinder identification is performed a predetermined number of times or more, permitting further higher accuracy of the cylinder identification.

In the low speed zone of the engine, if a crank angle signal is issued at a predetermined cycle or less, the cylinder identification information indicative of the number of cylinder identifications is cleared and engine control is aborted. This makes it possible to inhibit erroneous engine control such as erroneous ignition timing control or fuel injection control resulting from a cylinder identification error.

The foregoing predetermined cycle is changed according to at least one of the engine temperature and the battery voltage. The cycle of the cylinder identification is set longer as the temperature is lower or the battery voltage is lower. This further reduces the possibility of cylinder identification errors, enabling inhibition of erroneous engine control such as the erroneous ignition timing control and fuel injection control.

If the start switch is changed from ON to OFF at a predetermined rotational speed or less, the cylinder identification information indicative of the number of times of cylinder identification is cleared, and the engine control including the ignition timing control and the fuel injection control is aborted. This makes it possible to inhibit erroneous engine control including erroneous ignition or injection caused by a cylinder identification error even if marked cyclic fluctuations occur or the engine revolution is reversed due to a hastened start or repeated hastened starts.

The cylinder identification is inhibited until the start switch is changed to ON next, so that a cylinder identification error can be further positively inhibited.

If the start switch is changed from OFF to ON before the engine speed reaches a predetermined rotational speed or more since the start switch was set to ON, then a change is made to increase the predetermined number of times, permitting further positive inhibition of a cylinder identification error.

The engine control including the ignition timing control and the fuel injection control is started when the cylinder identification has been repeated for a predetermined number of times or more. Hence, the starting process can be completed more quickly while securing accurate cylinder identification at the same time.

When a predetermined number of crank angle signals have been received, and if the number of times of identification in identifying cylinders is not greater than a predetermined value, then it is determined that the crank angle sensor has failed. Therefore, if there is a failure including a missing tooth of the crank angle sensor, such a failure of the crank angle sensor can be quickly and accurately detected, enabling inhibition of erroneous engine control such as erroneous ignition and erroneous injection caused by a cylinder identification error.

What is claimed is:

1. An electronic control unit for controlling an internal combustion engine by measuring a cycle of a signal output from a crank angle sensor and identifying a cylinder according to a calculated value determined on the basis of the cycle, the electronic control unit comprising:
    detecting means for detecting at least one of a temperature of the engine or a battery voltage;
    signal cycle calculating means for calculating a ratio of a present signal cycle to a previous signal cycle;
    comparing means for comparing the ratio calculated by the signal cycle calculating means with a judgment value;
    cylinder identifying means for identifying a cylinder according to a comparison result given by the comparing means; and
    judgment value changing means for changing the judgment value according to at least one of the temperature of the engine and the battery voltage that has been detected by the detecting means.

2. An electronic control unit for an internal combustion engine according to claim 1, further comprising engine controlling means that effects cylinder identification for a predetermined number of times or more before it starts engine control.

3. An electronic control unit for an internal combustion engine according to claim 2, wherein the engine controlling means changes the predetermined number of times according to at least one of the temperature of the engine and the battery voltage.

4. An electronic control unit for an internal combustion engine according to claim 2, wherein the engine control is at least one of ignition timing control and fuel injection control.

5. An electronic control unit for controlling an internal combustion engine by measuring a cycle of a signal output from a crank angle sensor and identifying a cylinder according to a calculated value determined on the basis of the cycle, the electronic control unit comprising:
    signal cycle calculating means for calculating a ratio of a present signal cycle to a previous signal cycle;
    comparing means for comparing the ratio calculated by the signal cycle calculating means with a judgment value;
    cylinder identifying means for identifying a cylinder according to a comparison result given by the comparing means; and
    engine controlling means for effecting engine control according to a cylinder identification result.

6. An electronic control unit for an internal combustion engine according to claim 5, wherein if a crank angle signal is produced by the crank angle sensor at a predetermined cycle or less in a low rotational speed zone of the engine, cylinder identification information is cleared, and the engine control by the engine controlling means is aborted.

7. An electronic control unit for an internal combustion engine according to claim 6, wherein the engine control is at least one of ignition timing control and fuel injection control.

8. An electronic control unit for an internal combustion engine according to claim 6, wherein the engine controlling means changes the predetermined cycle according to at least one of the temperature of the engine and the battery voltage.

9. An electronic control unit for an internal combustion engine according to claim 8, wherein the engine controlling means sets the predetermined cycle longer as the temperature is lower or the battery voltage is lower.

10. An electronic control unit for an internal combustion engine according to claim 5, wherein if a start switch for stating the engine is changed from ON to OFF at a predetermined rotational speed or less, then cylinder identification information is cleared, and the engine control by the engine controlling means is aborted.

11. An electronic control unit for an internal combustion engine according to claim 10, wherein the abortion of the engine control is that at least one of ignition timing control and fuel injection control is aborted.

12. An electronic control unit for an internal combustion engine according to claim 10, wherein the engine controlling means inhibits cylinder identification until the start switch is turned on next.

13. An electronic control unit for an internal combustion engine according to claim 5, wherein said engine control means effects cylinder identification for a predetermined number of times or more before it starts engine control, and if a start switch for starting the engine is changed from OFF to ON before an engine rotational speed reaches a predetermined rotational speed or more since the start switch has been turned on, then the predetermined number of times is changed.

14. An electronic control unit for an internal combustion engine according to claim 13, wherein changing the predetermined number of times is to increase the predetermined number of times.

15. An electronic control unit for an internal combustion engine according to claim 14, wherein the engine control is at least one of ignition timing control and fuel injection control, and the predetermined number of times of fuel injection control is decreased.

16. An electronic control unitfor an internal combustion engine according to claim 15, wherein the judgment value comprises a plurality of judgment values, and the comparing means compares the ratio of a present signal cycle to a previous signal cycle with a plurality of the judgment values to classify it into one of a plurality of zones according to the magnitude thereof, and the cylinder identifying means effects cylinder identification according to a time series pattern of the ratio classified into one of a plurality of the zones by the comparing means.

17. An electronic control unit for an internal combustion engine according to claim 15, wherein the cylinder identification is to identify at least one of a particular cylinder and a particular cylinder group.

18. An electronic control unit for controlling an internal combustion engine by measuring a cycle of a signal output from a crank angle sensor and identifying a cylinder according to a calculated value determined on the basis of the cycle, the electronic control unit comprising:

signal cycle calculating means for calculating a ratio of a present signal cycle to a previous signal cycle;

comparing means for comparing a ratio calculated by the signal cycle calculating means with a judgment value;

cylinder identifying means for identifying a cylinder according to a comparison result given by the comparing means; and failure determining means for determining that a crank angle sensor is faulty if the number of times of cylinder identification among a predetermined number of received crank angle signals is a predetermined value or less.

\* \* \* \* \*